United States Patent [19]

McGrath

[11] 4,299,270
[45] Nov. 10, 1981

[54] EARTH ENERGY SINK

[76] Inventor: William H. McGrath, 14 Winter St., Lexington, Mass. 02109

[21] Appl. No.: 21,455

[22] Filed: Mar. 19, 1979

[51] Int. Cl.³ ............................ C03B 23/08; F24J 3/02
[52] U.S. Cl. .................................. 165/45; 165/104.31; 126/427; 126/430; 126/400
[58] Field of Search ............... 126/400, 270, 271, 437, 126/436, 430, 431; 165/104 S, DIG. 4, 18; 62/260; 60/641

[56] References Cited

U.S. PATENT DOCUMENTS

| | | | |
|---|---|---|---|
| 4,010,731 | 5/1977 | Harrison | 165/45 |
| 4,024,910 | 5/1977 | Werner | 165/45 |
| 4,089,142 | 5/1978 | Kachadorian | 165/45 |
| 4,094,356 | 6/1978 | Asn | 165/45 |
| 4,124,061 | 11/1978 | Mitchell | 126/400 |

FOREIGN PATENT DOCUMENTS 2113341 11/1971 Fed. Rep. of Germany ........ 165/45

Primary Examiner—Samuel Scott
Assistant Examiner—G. Anderson
Attorney, Agent, or Firm—Joseph Zallen

[57] ABSTRACT

The heat sink underlays the structure served and comprises a shallow permeable layer near the surface through which water is circulated and the earth mass below it with which heat is exchanged by conduction and by controlled steady seepage and recycled by pumping from a deep level and by thermal conduction or both.

4 Claims, 5 Drawing Figures

EARTH ENERGY SINK

BACKGROUND OF INVENTION

This invention relates to devices and methods whereby the ground underlying a building is used for the storage of excess heat energy for useful recovery later, and as a useful source of heat from deep earth mass (geothermal energy).

It has long been known that the temperature of the earth beneath its surface generally becomes progressively warmer with depth at any time of year and attempts have been made in the past to utilize these reservoirs of heat. Prior art utilizing ground heat preexisting beneath the surface have involved the digging of deep wells and the pumping of the warm water. Attempts in the past to utilize these pre-existing reservoirs of subsurface heat have been difficult and expensive.

One object of the present invention is to provide devices and methods to utilize the earth below a building as an energy source for space heating when needed and as a sink for excess building heat when available.

A further object of this invention is to provide such an earth energy source in a manner to increase the available geothermal energy by shielding the source from losses by surface effects in the form of frost, precipitation, evaporation and radiation.

A further object of this invention is to provide such an energy sink which can be useful in simultaneous cooling and heating the building in the winter and cooling it in the summer.

Further objects and advantages of this invention will be apparent from the description and claims which follow taken together with the appended drawings.

SUMMARY OF INVENTION

The invention comprises in its broadest sense a building whose excess heat energy is exchangeable with the energy heat sink comprised by the ground underlying the building. The heat sink below the building has a plurality of regions, including a "high" level immediately beneath the ground floor of the building, a low level at some depth in the ground, and a "flywheel" region immediately adjacent to the interior face of the foundation walls. Excess heat energy from the building is either stored in the flywheel region or overflows the high level and is carried to the low level by conduction and by controlled steady seepage of warm condenser water wherein the temperature ranges are low but the mass is enormous. The warm condenser water is the by-product of a refrigeration process whereby excess heat is removed from an area or building process where it is produced. This warm water is spread out over the area of the high level or upper sink in a thin layer so as to promote maximum heat exchange with the lower level. Heat energy stored in the flywheel region is used directly for air heating by circulation through fan-coil devices or convectors of conventional type. Heat energy is returned from the deep sink by reversing the use of the refrigeration process so that effluent warm condenser water is used directly for air heating as aforesaid or is stored for such use in the flywheel region; while the refrigeration effect is expended in chilling water which is then circulated through the upper level and absorbs heat from the lower level by conductive flow, and a percentage of which is also warmed by direct contact with lower level earth in process of seepage and may be recovered by pumping to recirculate. Consequently the flow of heat energy both to and from the building is related to controlled seepage, and to enhanced conductive heat flow resulting therefrom.

The upper sink has a large heat exchange capacity, and includes a permeable stone layer beneath the building which is selected to assure proper spreading of the water and a system of perforated pipes for distribution of the water in the sink and redelivering the water to the interior of the building.

In its preferred form, the invention comprises having a thermal barrier extending beneath the building to the periphery of its foundation except for a small portion adjacent to the perimeter.

Specific Examples of Invention

Figure 1:
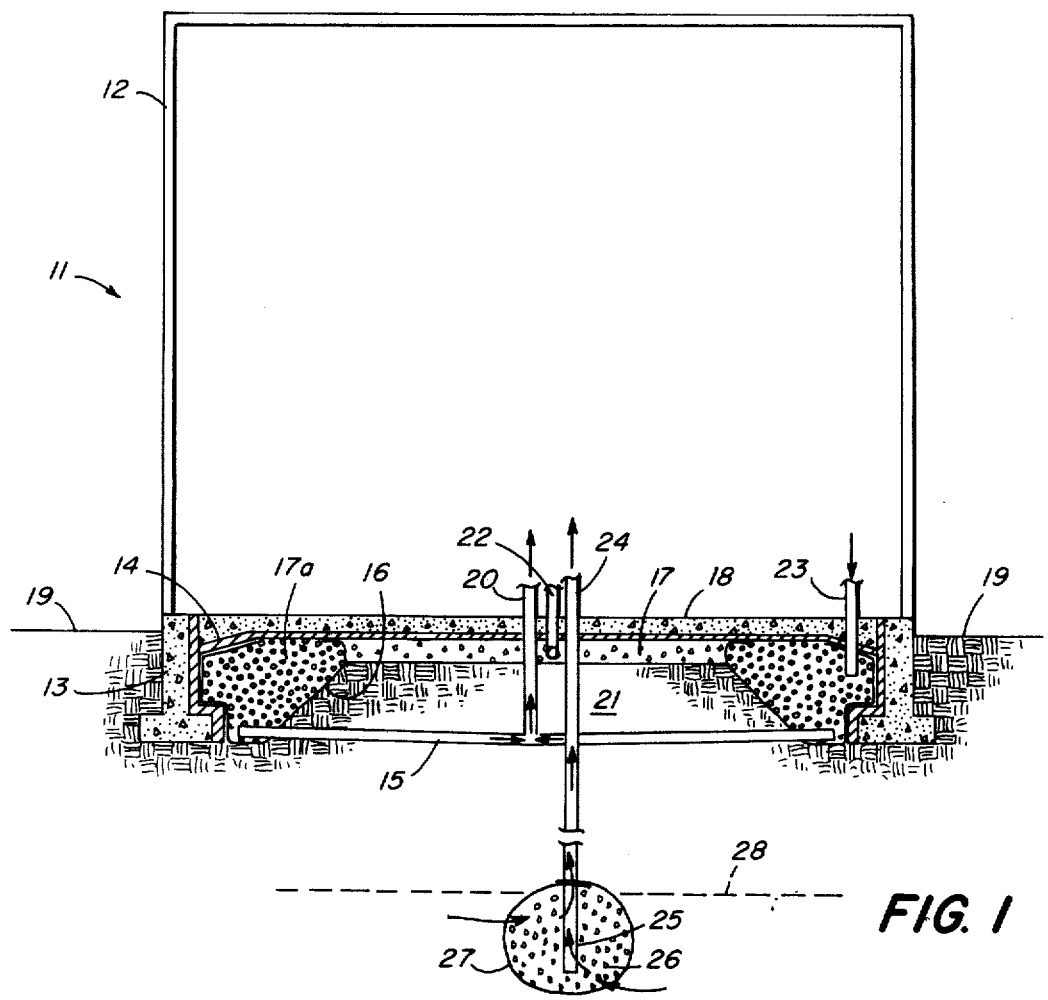
FIG. 1 is a vertical section in diagrammatic form.
Figure 2:
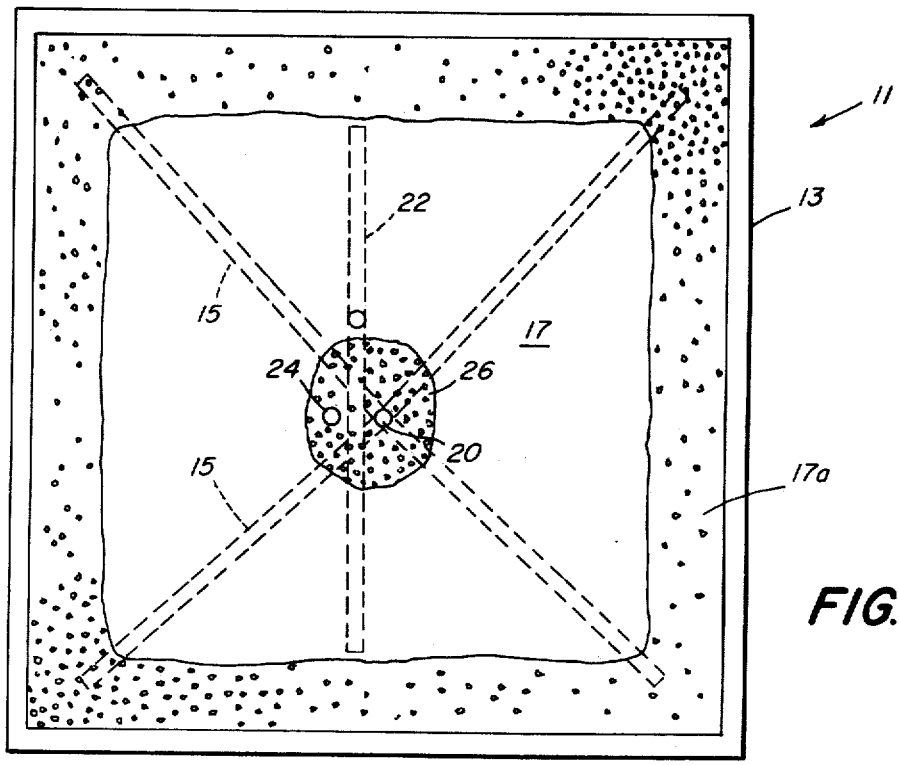
FIG. 2 is a horizontal section in diagrammatic form.

Referring now to FIGS. 1 and 2 there is illustrated therein in schematic form an assembly 11 comprising a building 12 in conjunction with the sub-surface. The building has a heating system and cooling system which would vary according to its location in the country and the requirements of its use. The perimeter of the foundation 13 and the bottom surface of the ground slab 18 of the building are separated from each other and from the ground below by an insulation layer 14 except for a portion at the exterior perimeter. In the portion of the ground below the insulation layer 14 is a layer of stones 17 as for example ¾ to 1½ inch crushed stones into which water from the building heating or cooling systems drains via conduit 22. At the perimeter is a thermal flywheel region comprised of a "french" drain 17a also having crushed stone and surrounded except for a small top portion, by a water barrier, as for example a plastic film 16 made substantially water impervious by impregnation with a colloidal suspension of clay with plasticising agents introduced via water supplied through conduit 23 from the building refrigeration system condensers (i.e. heat pumps).

The water coming into the upper core area 17a flows horizontally through the french drain to collector pipes 15 and then is sucked upward by the system pumps through conduit 20, the base of which includes a check valve to prevent loss of prime on pump shutdown. The massive water and rock within the envelope at 17a can yield heat directly to the building by way of finned piped coils. Excess heat from the building interior and other sources, such as building exhaust air, is transferred into the refrigeration system condensers in conventional fashion using a water medium at appropriate temperatures. This water is then flowed to either of conduits 22 or 23, depending on need. The temperature in heat storage region 17a is automatically increased as the outdoor temperature falls in conformance to a predetermined schedule, as for example a one degree rise in storage temperature for each 3-degree fall in outdoor temperature, by operation of the building heat pumps for suitable time intervals extracting heat, first from sources of excess heat as above noted, and second from regions 17 and 21 by flowing chilled water into conduit 22 and effluent warm condenser water into conduit 23. When temperature in region 17a rises above scheduled values the operation of building heat pumps is reduced to the minimum required for excess heat removal and flow of warm condenser water is diverted from conduit 23 to conduit 22 for recharging heat to regions 17 and 21.

The dimensions of region 17a are selected such that the available heat yield from the aggregate mass is sufficient to satisfy the heat requirement for reheating the building and its contents to normal occupancy temperature following a period of prolonged reduced temperature while occupied, such as over a week end.

With respect to the deep sink the flow from the drain 22 into the conduction and seepage bed 17 is variable. Thus when there is waste heat in excess of the requirements of region 17a, the refrigeration condensers will drain out through conduit 22 but when there is a need for building heat, only chilled water will drain through conduit 22. It should be noted that the flow of chilled water must be less than seepage losses so that none of the water from drain 22 will reach the upper sink 17a. The chilled water is obtained by expending the heat pumps' refrigeration effect upon water, lifted from the lower sink or ground water table.

In the alternative instance where inadequate seepage rates are encountered, or where seepage water recovery is impracticable regions 17 and 17a are separated by an insulation barrier, and element 26 is rearranged such that effluent from conduit 22 must overflow all of region 17 before collecting at 26 and being recirculated through conduit 24. In such application region 17 is treated to reduce seepage to a value which optimizes energy conservation based upon the comparative value of heat transported deep into the ground with the seepage water and subsequently recovered by conductive flow, and the value of water and heat lost with seepage water in the heating season.

Stone bed 17 can also be treated with sealant materials such as clays to regulate the rate of seepage through the ground 21 to a water collection stratum or to the static ground water table 28; which can be at a considerable depth below the building depending upon where the building is located.

In the preferred application, a deep sink structure is spaced within the static ground water table 28 and comprises an outer filter cloth 27 enclosing permeable aggregate 26 surrounding the opening to a pipe 24 which is the deep sink pickup pipe, and includes a check valve to prevent loss of pump prime. In the event that region 26 is too far below ground to permit suction lifting, conduit 24 would be adapted to accommodate a deep well type pump instead of a check valve.

Figure 3:
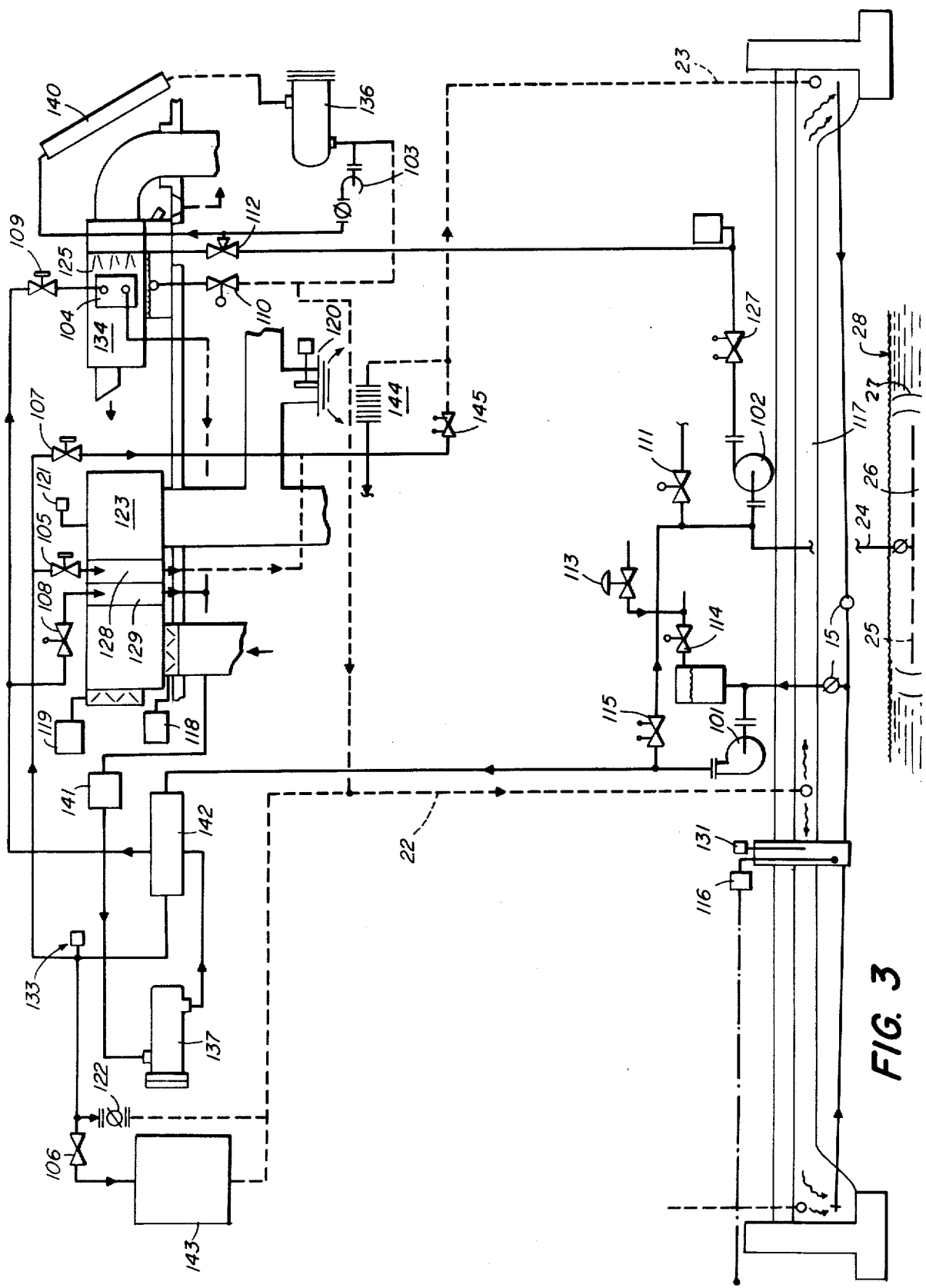
FIG. 3 is a schematic diagram showing an example of a detailed layout.
Figure 4:
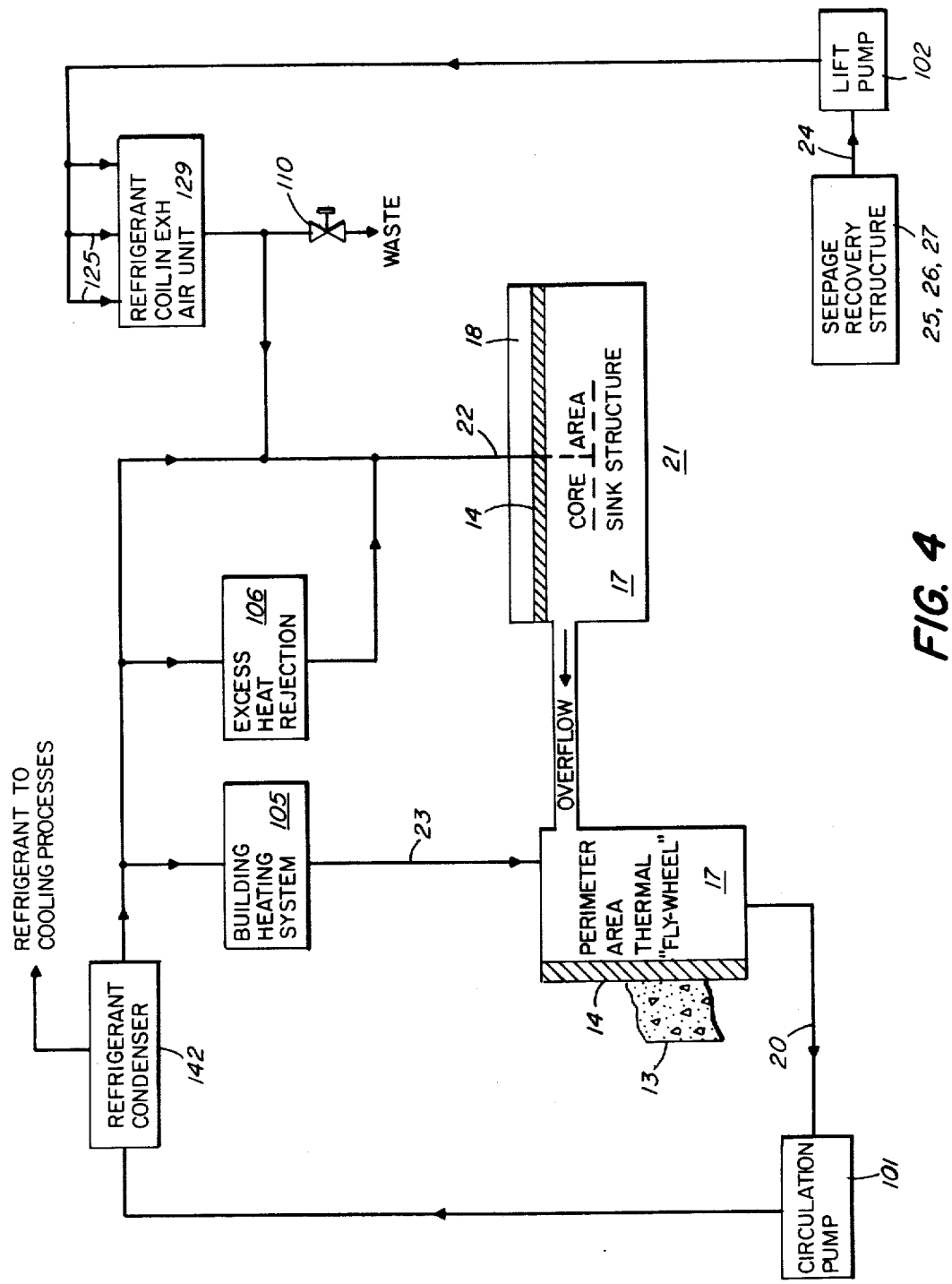
FIG. 4 is a schematic diagram showing in simpler form the preferred arrangement when annual heating needs exceed cooling on a cost basis.
Figure 5:
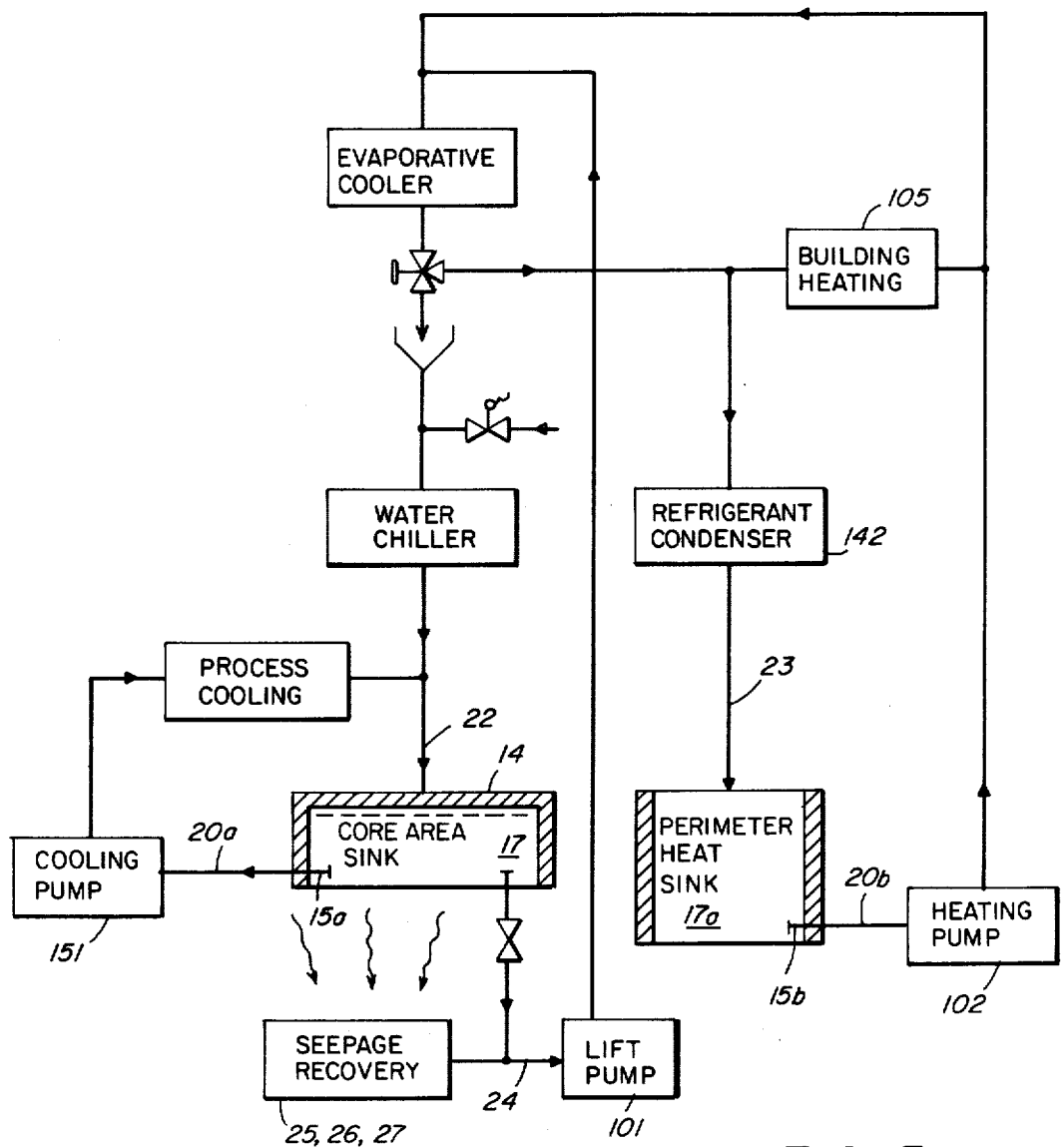
FIG. 5 is a simplified diagram illustrating the invention applied where the annual heating needs are relatively small and off peak production and storage of chilled water is cost beneficial.

Referring now to FIG. 3, a schematic arrangement showing a building heating conservation application of the invention where a ground water table exists within 20 feet of the lowest building floor slab and the intervening ground is not impermeable: the ground immediately under the building is referred to as the shallow sink circuit, 117 and that within the water table as the deep sink, 25, 26, 27.

A main distribution pump 101 circulates water from the shallow sink return circuit via pipes 24 through a condenser 142 where heat resulting from compressor 141 compressing the cold refrigerant gas effluent from the processes served by valves 108 and 109 is absorbed. A supplementary pump 102 extracts water from the deep sink stratum 26 and is started by level sensor 131 or by interlock with valves 109 and 112 and discharges either to spray nozzles 125 in the building exhaust system 134 to yield heat to the refrigerant in a sprayed coil 104 or discharges through solar collectors 140 to add heat to the shallow sink circuit, 117. Volume delivered by pump 102 is regulated by setting valve 127 so as not to exceed the seepage rate to lower sink stratum 26.

A pressure regulating valve 113 meters city water supply to the priming system of the pump whenever valve 114 is open. Valve 114 opens when pump 101 is off, when sink level controller 131 senses low level, or on loss of flow from pump 101 during an ON cycle, to supply priming water as needed to prevent air binding of pump 101 and to maintain proper sink water level. Valve 115 maintains prime on pump 102.

A thermal controller 116 senses both outdoor temperature and the shallow sink circuit 117 return water temperature. When circuit 117 temperature is below the value scheduled as suitable for the outdoor temperature, controller 116 opens valve 109 (and 112, in certain cases as hereafter described) to pump additional heat into the circuit.

Valve 105 is actuated during a time period prior to building occupancy when supply fan 123 is being operated recirculating air for building warm-up only. Until the recirculated air reaches desired temperature valve 105 remains open to supply warm water from the circuit 117 to the heating coil 128 in the supply fan circuit. After flowing through the coil the water then flows through finned pipe radiation 144, (or convectors or duct reheat coils) before final discharge to the circuit 117 via pipes 23.

The shallow sink circuit 117 consists of a french drain formed of permeable aggregate backfill 17a of engineered flow characteristic placed along the interior face of the building foundation wall. Engineered insulation barriers 14 limit heat flow through the foundation wall and to the superincident spaces. The scheduled variation in circuit temperature 117 with outdoor temperature is designed in consideration of required temperature to achieve morning warm-up and of the radiant heat output needed to warm the spaces above to an appropriate degree; and barrier insulation is omitted under portions of floor slab at exterior building exposures over circuit 117 as necessary to offset heat losses from such exposures, net of average internal gains. This minimizes first cost of slab barrier insulation, and reduces the amount of building skin heating radiation needed, while providing a more comfortable environment.

Water is confined to the circuit 117 by lining the base of it with polyethylene 16 or similar impervious film and/or by supplemental treatment with seepage control material such as a colloidal suspension of bentonite clay 21 or the like. The volume of water, aggregate, and adjacent non-insulated earth which participates in the controlled temperature schedule is engineered to be of sufficient mass such that all of the heat needed for building warm-up is obtained without reduction of circuit 117 temperature below economical temperature relative to coil surface required to exchange heat from sink water to system air. This feature of the system is distinguishable from prior designs wherein heat stored from prior operations cannot be utilized at the temperature of initial storage and must be pumped a second time, with consequent reduction in overall efficiency, and wherein the amount of stored heat is not adequate to achieve the desired warm-up.

Valves 106 and 107 direct the flow of condenser effluent to either the heat rejection or the heat utilization circuits. They are operated at outdoor temperatures appropriate to the building characteristics and sink temperature. The sequence of actuation is as follows:

When both valves 106 and 107 are closed water flows to the heat rejection circuit through spring loaded by-pass valve 122 (or gravity lift loop equivalent), and thence to the central area of the blanket drain underlying the building ground slab. As the water flows toward the perimeter of the shallow circuit 117 it seeps into the substrata to some degree and it loses heat by conduction to the substrata to some degree. If the rate of seepage exceeds an amount roughly equal to ten percent of the design circulation rate, it is reduced by treatment with suitable colloidal suspensions noted above. This controlled seepage serves to carry waste heat into the deeper levels of the earth underlying the building for long term storage.

If the ground water table is not within reasonable distance to obtain recirculation from seepage losses by pump suction lift a deep well type pump would be installed. In such case exploratory borings would be required to determine the probable path of seepage water migration and best location of well to intercept seepage flow.

When circuit 117 temperature rises above the value scheduled by controller 116, sensor 133 opens valve 106 to divert flow over the cooling tower for evaporative cooling effect. On further rise to a predetermined high temperature sensor 133 runs the cooling tower fan for conventional forced evaporative cooling, during off-peak power cost periods.

When outdoor temperature falls to a level at which skin heat loss during occupied periods is sufficient to create cold drafts at outside exposures, valve 107 opens and warm condenser effluent flows to the skin draft barrier radiation circuits.

When shallow sink circuit 117 temperature falls below the value scheduled by controller 116, i.e., is not warm enough to provide sufficient energy for morning warm-up and to offset skin losses during building occupancy, valve 109 opens to admit liquid refrigerant to the heat recovery coil 104. If this occurs during building occupancy when air exhaust unit 134 is exhausting air from the building, the refrigerant coil will cool the exhaust air, usually by about 30 degrees. This heat, together with the heat of compression is transferred to the circuit 117 water as it passes through the condenser. Generally about 4 units of heat energy are obtained in this cycle for each equivalent heat unit of electricity expended on compressor 141 operation.

If valve 109 is actuated during an unoccupied period when air exhaust unit 134 is off, pump 102 is started. With valve 112 in normal position water will flow through spray nozzles 125 and drench the refrigerant coil 104 in air exhaust unit 134. The water will be chilled, generally to about 40 F., and heat will be transferred in the same manner as above described.

In regions where peak electric power demand occurs in a cold month the refrigerant compressor and pump 102 would be limited to operation during non-peaking hours to minimize power charges. This is another advantage of the large storage capacity afforded by the sink design.

When circuit temperature 117 falls below scheduled values on sunny days valve 112 is operated to start pump 102 and divert its flow to join the runaround circuit through solar collectors 140 normally yielding heat to a domestic service water system. Since solar collector efficiency is directly proportional to the difference between ambient air temperature and average circulation temperature, and deep sink water temperature is from 60 to 25 degrees cooler than that required to heat domestic service water, this feature results in a substantial increase in collection of solar energy from a given capital investment.

When valve 112 is in normal position directing flow from pump 102 to coil sprays 125 at air exhaust unit 134 pump 103 is operated to transfer energy from solar collectors 140 to domestic service water in a conventional manner.

Among the other features of this application of the invention is the use of a conventional arrangement of heat exchanger 137 using the high level heat available from compressor 141 cylinder head coolant and/or superheated refrigerant gas discharge from the compressor to generate hot water for domestic services in lieu of solar collectors when appropriate. Also a blocking valve 110 is closed or throttled by a limit thermostat if water temperature from the deep stratum has fallen below optimum. This forces spray water to back up and overflow to surface drains resulting in wastage of chilled water in an amount equal to available ground water supply when system efficiency is enhanced thereby.

Valve 111 is actuated by temperature controller 116 so that when the sink temperature falls to the minimum range of the schedule it admits warm water from a supplementary heat source.

Conventional outside air/recirculation air mixing dampers 118 and 119 are used to obtain free cooling by outdoor air; but when used with this sink system, their action is not permitted if circuit 117 temperature is below the value scheduled by controller 116. This forces the system to use mechanical refrigeration and consequently captures building waste heat in weather periods when it can be used for space heating. Valve 108 controls supply of refrigerant to the air cooling coils 129 in accordance with the needs of the building in a conventional manner, except the air delivery temperature is adjusted according to weather over a suitable range; e.g., 55 F. to 65 F. This feature in conjunction with the use of variable volume diffusers 120 result in a saving in energy expended for air reheating in cold weather.

Another feature is a thermostatically controlled variable volume diffuser 120 which, together with the variable air supply temperature schedule, reduces energy use as in the following example:

Interior building spaces require cooling at all times of occupancy but exterior spaces may require heating or cooling due to variable temperature, wind, sun, and occupancy effects. If each such space is represented by a single diffuser 120, one can design the interior space to satisfy space cooling needs based on 65 F. air supply and the exterior space to satisfy space cooling needs based on 55 F. air supply.

In warm weather, with air supply at 55 F. the sunlit exterior space will receive design air supply and the interior space will have air supply reduced by thermostat throttling of its variable volume diffuser 120. In cold weather, with air supply at 65° F. a dark windward exterior space will have air supply throttled to minimum; hence, minimum reheat required by skin radiation. Maximum air supply will then be available for the interior space.

In intermediate and sunny weather the diffusers will assume throttled positions and will act to conserve fan energy.

I claim:

1. In combination, a building structure having a heating and air conditioning system, an upper water-permeable layer spaced in the ground immediately below the structure and including a bed of stones over which water is flowed and conduit means for collecting and returning the water to said heating and air conditioning system, a heat storage region extending substantially along the perimeter of the structure and insulated from the ground so as to form a thermal flywheel region, a water barrier separating said thermal flywheel region from said upper water-permeable layer, and a deep sink source spaced within the ground water table in the ground below said structure; pump and valve means being provided to selectively circulate water between said heating and air conditioning system and said flywheel region.

2. The combination of claim 1 wherein said water-permeable layer comprises means for controlled seepage of water into the adjacent ground.

3. The combination of claim 1 wherein said deep energy sink source comprises exterior water-permeable wall means, permeable aggregate and conduit means for collecting ground water and returning it to the said heating and air conditioning system.

4. The combination of claim 1 wherein said thermal flywheel region comprises crushed stone surrounded except for a small top portion by a water-impervious film and containing water conduit means connected to said heating and air conditioning system.

* * * * *